United States Patent [19]

Carr

[11] Patent Number: 5,596,807
[45] Date of Patent: Jan. 28, 1997

[54] HAND TOOL AND METHOD FOR USE THEREOF

[76] Inventor: Charles C. Carr, 273 Saint Marks Pl., Staten Island, N.Y. 10301

[21] Appl. No.: 494,611

[22] Filed: Jun. 23, 1995

[51] Int. Cl.$^6$ .................................................. A47J 43/26
[52] U.S. Cl. ......................... 30/120.3; 30/120.5; D7/680
[58] Field of Search ................................ 30/120.1–120.5; D7/98

[56] References Cited

U.S. PATENT DOCUMENTS

| | | |
|---|---|---|
| D. 342,423 | 12/1993 | Blaylock . |
| 641,581 | 1/1900 | Currence . |
| 1,017,424 | 2/1912 | Kwiatkosky . |
| 1,499,653 | 7/1924 | Hagadorn . |
| 3,048,208 | 8/1962 | Umanoff . |
| 5,351,402 | 10/1994 | Mansfield ................................ 30/120.3 |

*Primary Examiner*—Douglas D. Watts
*Attorney, Agent, or Firm*—Jordan and Hamburg

[57] ABSTRACT

A hand tool for compressing objects has first and second opposing pivotally connected members for receiving an object and an extension of the first pivotal member permitting striking of the extension to effect sudden and rapid compression of the object. The second pivotal member optionally has surface adapted to engage a user's hand. In a first embodiment the second pivotal member has a grip contoured surface on a receptacle member for accepting the user's fingers and a support flange extending from a pivot point on the second pivotal member for engaging a side of the user's hand. The first pivotal has a knurled portion proximate the pivot point engageable by the user's thumb. Embodiments include various combinations of support surfaces. The invention includes a method for compressing an object including placing the object between the first and second pivotal members and striking an opposing extension of one of the pivotal members to compress the object. Work piece objects include nuts, crab and lobster shells and grommet type devices where the first and second pivotal members are adapted to receive such devices.

14 Claims, 8 Drawing Sheets

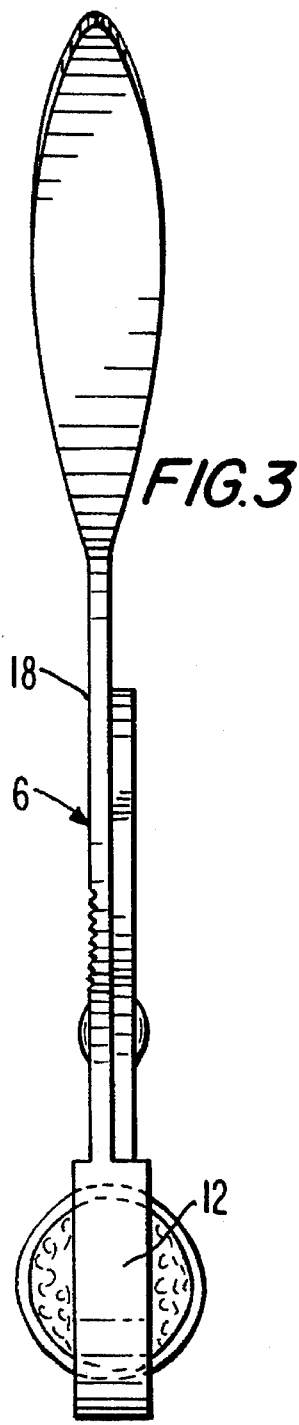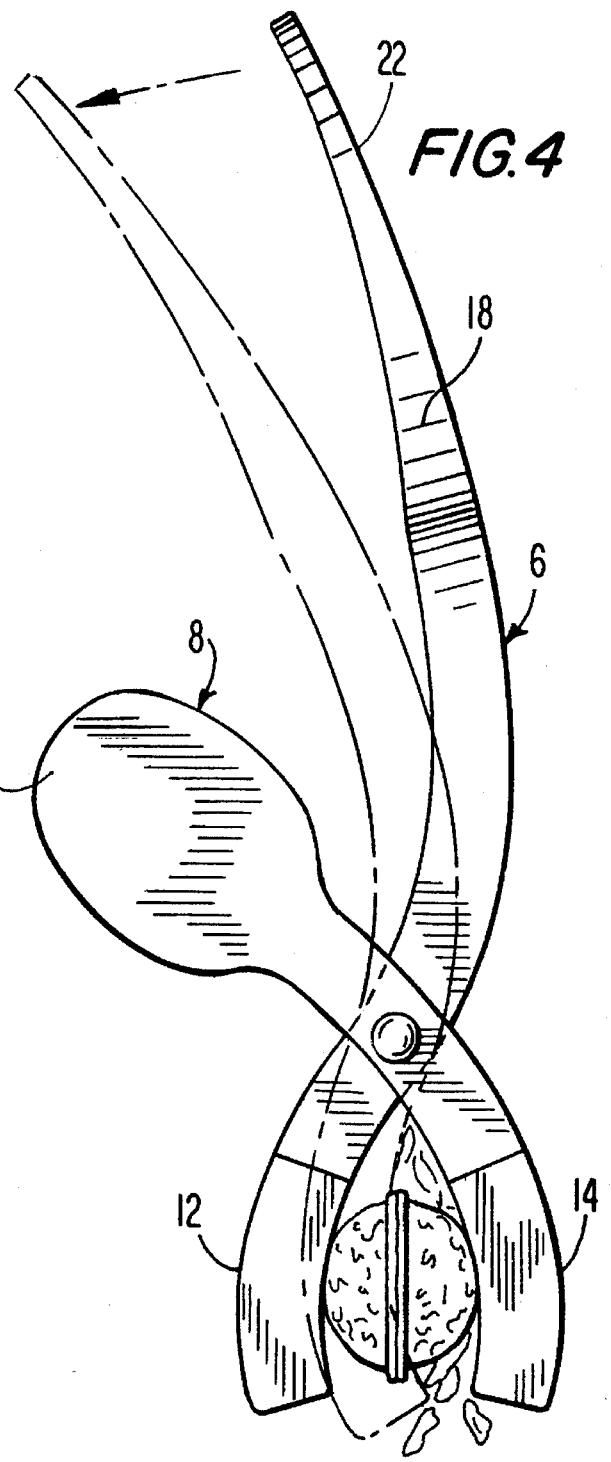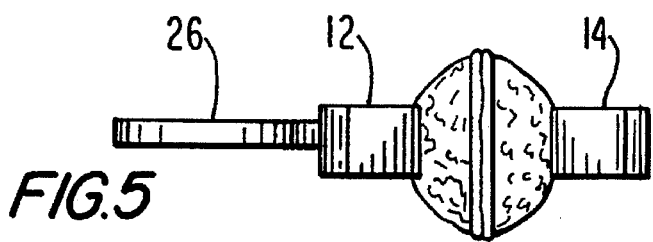

HAND TOOL AND METHOD FOR USE THEREOF

BACKGROUND OF THE INVENTION

The present invention provides a hand tool for imparting compressive forces upon an object, and more particularly, a hand tool having opposing pivotal members for receiving an object and an extension of one of the pivotal members permitting striking of the extension to effect sudden and rapid compression of the object. The hand tool and method of use are applicable to the cracking of nuts, lobster shells, crab shells, or other objects requiring the application of force to effect fracturing thereof, and also the installation of items requiring compression, such as grommets.

Various tools for cracking nut shells and other shells are known. Generally, such cracking tools have pivoting members providing for the placement of an object to be cracked between the pivoting members. The user then uses muscles effecting closure of the user's hand to apply a compressive force to the pivoting members to compress and crack the object. This type of cracking tool requires that the user have sufficient strength to apply a force capable of cracking the object. The length of the pivoting members may be extended to provide a greater mechanical advantage than a shorter cracking tool of similar design. As a consequence of increasing the pivoting member length, the force required to crack an object is reduced at the expense of increasing the travel of the pivoting members. Cracking tools having an adequate mechanical advantage to permit use by individuals having limited strength, such as children and the elderly, are longer than would be preferred and unwieldy. Furthermore, the increased travel of the pivoting members is particularly disadvantageous for children because the hand span of a child may very well be less than the travel range of the pivoting member requiring the child to use two hands to operate the device.

A second type of known cracking tool employs a screw mechanism. The cracking tool has a cavity for receiving an object to be cracked and a threaded aperture through which a screw member is advanced into the cavity to apply force to crack the object. The pitch of the threads determines the mechanical advantage achieved by the cracking tool dictating a torque necessary for cracking the object. Cracking tools of the screw type configuration having a coarse pitch often require more torque than a child, or physically challenged person can apply. Screw type cracking tools having a fine pitch allow operation with less torque but require a greater number of revolutions to effect cracking than a cracking tool having a coarse pitch. The increased number of revolutions required for operation can result in fatigue of the user's wrist.

A third type of known tool is of a mallet type. The mallet type cracking tool generally has a mallet and a holder for the object to be compressed or cracked. The user places the object to be cracked in the holder and strikes the object with the mallet. Such operation presents the possibility of pieces of the cracked object being scattered by the impact of the mallet. Furthermore, the mallet and holder are independent of each other and are thus prone to be separated and misplaced.

Another type of operation requiring the application of compressive forces is the installation of grommets. Grommets are generally comprised of a ring piece and a ring and post piece. The ring piece is placed on a first side of a material having a hole therein and the ring and post piece is inserted through the hole in the material and the ring piece. Once in place, the ring and post piece is place upon an anvil piece and a swaging tool is placed over the post protruding the ring piece. The swaging tool is struck with a mallet and deforms the post over the ring piece effecting installation of the grommet. While the process is effective, several distinct tool pieces are required, the anvil piece, the swaging tool, and the mallet. The distinct pieces are thus prone to being misplaced and separated.

SUMMARY OF THE INVENTION

Accordingly, it is an object of the invention to provide a hand tool which overcomes the drawbacks of the prior art.

It is a further object of the invention to provide a hand tool for cracking objects which is usable by persons having limited physical strength or grasping reach.

It is a still further object of the invention to provide a hand tool which allows the user to crack objects while holding the object to be cracked in the palm of their hand.

It is yet another object of the invention to provide a hand tool for the installation of grommets and other rivet type fasteners.

An object of the present invention is to provide a method for compressing objects wherein a user places an object to be compressed between receiving ends of two pivotally connected member and strikes an extension of one of the pivotally connected members against a surface to effect compression.

Another object of the present invention is to provide an improved method and apparatus for cracking nuts.

Additionally, an object of the present invention is to provide an improved method and apparatus for installing grommets and similar devices.

Briefly stated, the present invention provides a hand tool for compressing objects having first and second opposing pivotally connected members for receiving an object and an extension of the first pivotal member permitting striking of the extension to effect sudden and rapid compression of the object. The second pivotal member optionally has surfaces adapted to engage the users hand.

In a first embodiment the second pivotal member has a grip contoured surface on a receptacle member for accepting the user's fingers and a support flange extending from a pivot point on the second pivotal member for engaging a side of the user's hand. The first pivotal member has a knurled portion proximate the pivot point engageable by the user's thumb. Embodiments include various combinations of support surfaces.

The invention also includes a method for compressing an object including placing the object between the first and second pivotal members and striking an opposing extension of one of the pivotal members to compress the object. Work piece objects include nuts, crab and lobster shells and grommet type devices where the first and second pivotal members are adapted to receive such devices.

In accordance with these and other objects of the invention, there is provided a hand tool for compressing an object having first and second lever members with means for pivotally connecting the first and second lever members at a pivot point. The first and second lever members respectively have first and second receiving ends configured for accepting the object to be compressed. The first and second receiving ends are disposed proximate the pivot point and the first lever member has an arm projecting from the pivot point opposite the first receiving end. One of the first and second lever members has at least one engagement surface for engaging a user's hand grasping the first and second receiving ends. Additionally, the second lever member has a mass sufficient to oppose a force of said first lever member when the arm of the first lever member is struck upon a surface.

The present invention also includes the above embodiments wherein, in the alternative, various implementations of features of the above embodiment are incorporated. For example, in one embodiment the hand tool includes one of the first and second receiving ends having the at least one engagement surface wherein the at least one engagement surface includes means for accepting fingers disposed thereon. Another embodiment includes the second receiving end including the at least one engagement surface, and the second lever member including a support flange extending from the pivot point of the second lever member such that the support flange is engageable with a user's hand grasping the at least one engagement surface. Further embodiments include the first and second receiving ends having jaw shaped or cupped receptacles for accepting the object. Yet another embodiment includes one of the first and second receiving ends having a grommet swaging post, and another one of the first and second receiving ends having a grommet swaging anvil configuration complementing the grommet swaging post. Still another embodiment includes the second lever member extending from the second receiving end and terminating about the pivot point.

The present invention also provides a method for compressing objects including providing first and second lever members pivotally connected at a pivot point, the first and second lever members respectively having the first and second receiving ends configured for accepting the object to be compressed. The first and second receiving ends are disposed proximate the pivot point and the first lever member having an arm projecting from the pivot point opposite the first receiving end. The object to be compressed is inserted between the first and second receiving ends and the first and second receiving ends are grasped in one hand with the object to be compressed therebetween. The arm of the hand tool is struck against a surface thereby compressing the object; and a sufficient length of arm is provided to develop a mechanical advantage permitting adequate compression of the object by the striking action. The method may be applied to the cracking of nuts and the installation of grommets and similar devices.

According to a feature of the invention, there is further provided a hand tool for compressing an object comprising first and second lever members pivotally connected at a pivot point. The first and second lever members respectively have first and second receiving ends configured for accepting the object to be compressed. The first and second receiving ends are disposed proximate the pivot point and the first lever member has an arm projecting from the pivot point opposite the first receiving end. The second receiving end includes means for accepting fingers disposed thereon and a support flange extending from the pivot point of the second lever member such that the support flange is engageable with a user's hand grasping the second receiving end at the means for accepting fingers. Additionally, the arm has a length sufficient to develop a mechanical advantage permitting adequate compression of the object when an end of the arm is struck upon a surface.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a top view of the embodiment of FIG. 1.

FIG. 4 is a side view of the embodiment of FIG. 1 showing operation of the present invention.

FIG. 5 is an end view of the embodiment of FIG. 1.

DETAILED DESCRIPTION OF THE INVENTION

Figures 1, 2:
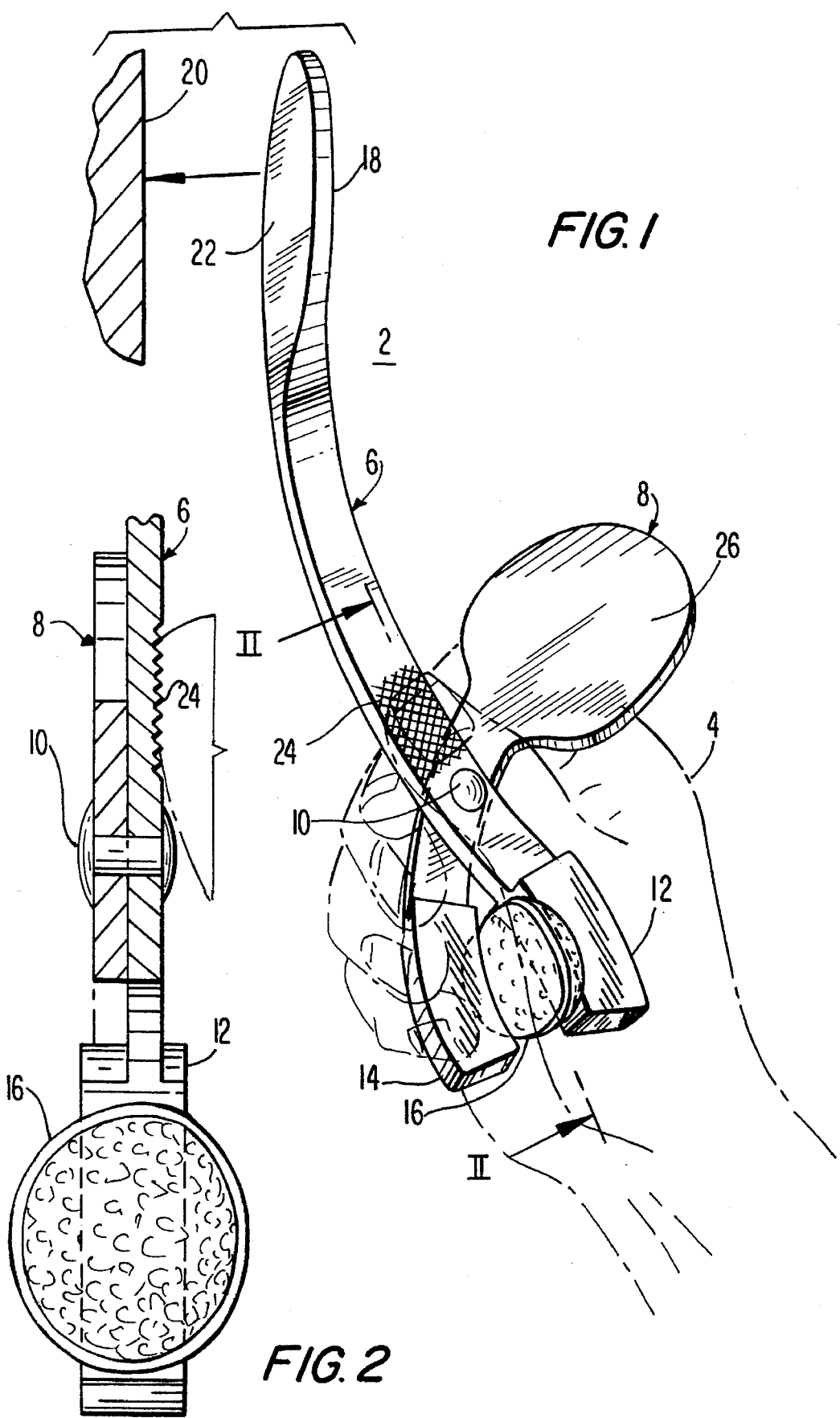
FIG. 1 is a perspective view of an embodiment of the present invention in operation.
FIG. 2 is a cross-sectional view of the embodiment of FIG. 1 taken along line II—II.

Referring to FIG. 1, a first embodiment of a hand tool 2 of the present invention is shown within the grasp of a user's hand 4. The hand tool 2 has first and second lever members, 6 and 8, pivotally connected by a pin 10 at a pivot point. The pin 10 is illustrated as a peened rivet, however, any pin-type fastener may be used including screws and posts integrally formed in one of the first and second lever members, 6 and 8. The first and second lever members, 6 and 8, have first and second receiving ends, 12 and 14, respectively, which accept interposed therebetween an object to be compressed or cracked, for example a nut 16. The first lever member 6 has a striking arm 18 extending outward from the pivot point a distance beyond an enclosure of the user's hand 4. The nut 16 is disposed between the receiving ends, 12 and 14, which are enclosed within the grasp of the user's hand. The receiving ends, 12 and 14, have a jaw shaped configuration and accept various items to be cracked or compressed in addition to nuts, such as lobster and crab shells.

The hand tool 2 is operated by placing the nut 16 between the receiving ends 12 and 14 and grasping the receiving ends 12 and 14 as shown. The user then strikes the striking arm 18 against a surface 20, for example a table, chair arm, or the user's free hand. The sudden impact of striking is transmitted via the first lever member 6 to the nut 16 by cooperation of the first and second lever members 6 and 8 at the pin 10. The striking force effects a closing of the receiving ends 12 and 14 at sufficient force and velocity to reliably crack the nut 12 without the user having to apply excessive manual force. In particular, the striking action in combination with leverage provided by the relative lengths of the first receiving member 12 and the striking arm 18 produces a force characteristic having a sharp rate of attack which is well suited to the fracturing of nut shells. Thus, the user can effectively crack nuts within the palm of their hand, simultaneously containing the pieces within their hand and allowing the meat of the nuts to be eaten out of the palm.

Referring to FIGS. 1 through 5, various aspects of the hand tool 2 are illustrated. The striking arm 18 has a striking face 22 defined by a broadened portion of the striking arm 18. The striking face 22 serves to distribute the force of the striking operation over a larger area of the surface 20 which is struck. The distribution of force reduces the amount of denting or marring which may result on the surface 20 from the impact of striking. Of further importance is the distribution of force when the user uses their free hand as the striking surface 20. The striking face 22 is configured to have sufficient surface area to allow the user to strike the striking face 22 against the palm of their free hand without discomfort. While the expanded striking face 22 is a desirable feature of the present invention, it is realized that the present invention may be effected without broadening striking arm 18. Such a configuration is fully within the scope and spirit of the present invention.

The striking arm 18 is held between the user's thumb and index finger during operation as depicted in FIG. 1. The striking action serves to displace the striking arm 18 as shown in FIG. 4. In order to facilitate a firm hold on the striking arm 18 when effecting the striking operation, there is provided proximate the pin 10 a knurled area 24 for receiving the user's thumb. Since the knurled area 24 is close to the pin 10, when the striking face 22 engages the surface 20 the striking arm 18 is easily pivoted about pin 10 resulting is a slight deflection of the user's thumb. Thus, the knurled area 24 simultaneously allows a firm grasp to be obtained for striking and is positioned close to the pivot point to produce a mechanical advantage allowing deflection of the thumb thus permitting a pivoting motion of the first lever member 6.

The second lever member 8 has a support flange 26 which engages the side of the user's index finger when the hand tool 2 is grasped as shown in FIG. 1. The support flange 26 may optionally be knurled on the surface engaging the user's index finger. The second receiving member 14 is optionally held by at least three of the user's fingers. Thus, during operation, the second lever member 8 is securely held at the second receiving member 14 and at the support flange 26 to oppose force applied by the first lever member 6. The second lever member 8 is supported at portions distant from the pin 10 to provide greater torque opposing the force of the first lever member 6. In contrast, and as noted above, the first lever member 6 is positively engaged at the knurled area 24 which is close to the pivot point resulting in little torque opposing rotation of the first lever member 6 about the pin 10 when the striking face 22 engages the surface 20. The construction of the hand tool 2 thus provides for the rotation of the first lever member 6 with respect to the second lever member 8 which is firmly supported. Variations of the present embodiment may include a second lever member without a support flange for engaging the user's index finger or a support flange extending from the second receiving member 14 and engaging the user's hand. It is also possible to effect the present invention without a support flange wherein the user simply grasps the receiving member 14 with the fingers and steers the first lever member 6 with the thumb. These and other variations may be effected by those of ordinary skill in the art and are considered to be within the scope and spirit of the present invention.

In addition to providing surface area for secure contact with the user's index finger, the support flange 26 is configured to provide a mass which has sufficient inertia and momentum to oppose a force of the first lever member 6 when an object is crushed between the first and second receiving members, 12 and 14. The downward motion of the user's arm when operating the hand tool 2 imparts motion to the support flange 26 hence providing momentum which, by action of the second lever member 8, applies force via the second receiving end 14. The mass may be provided either by enlarging the surface area of the support flange 26, that is extending a radius of the support flange 26 or by increasing a thickness of the support flange 26. In variations of the present invention, wherein no support flange is provided, it is desirable to supply a weight to replace the mass of the support flange 26. Alternatively, the second receiving end 14 may be increased in mass to provide inertia to oppose the force of the first receiving end 12.

One construction of the hand tool 30' includes an overall weight of the first and second lever members being about 10 oz. with the striking arm 18 extending six inches from the pivot pin 10. The first lever member 6 has a weight of about 4.0 oz while the second lever member 8 has a weight of about 6 oz. The support flange 26 weighs about 3.5 oz. and has a center of mass about two inches form the pin 10. A center point of each of the first and second receiving ends, 12 and 14, lies about one inch from the pin 10. The dimensions and weights are provided as an example of a possible construction of the present invention and in no way limit alternative configurations considered within the scope of the present invention.

Figure 6:
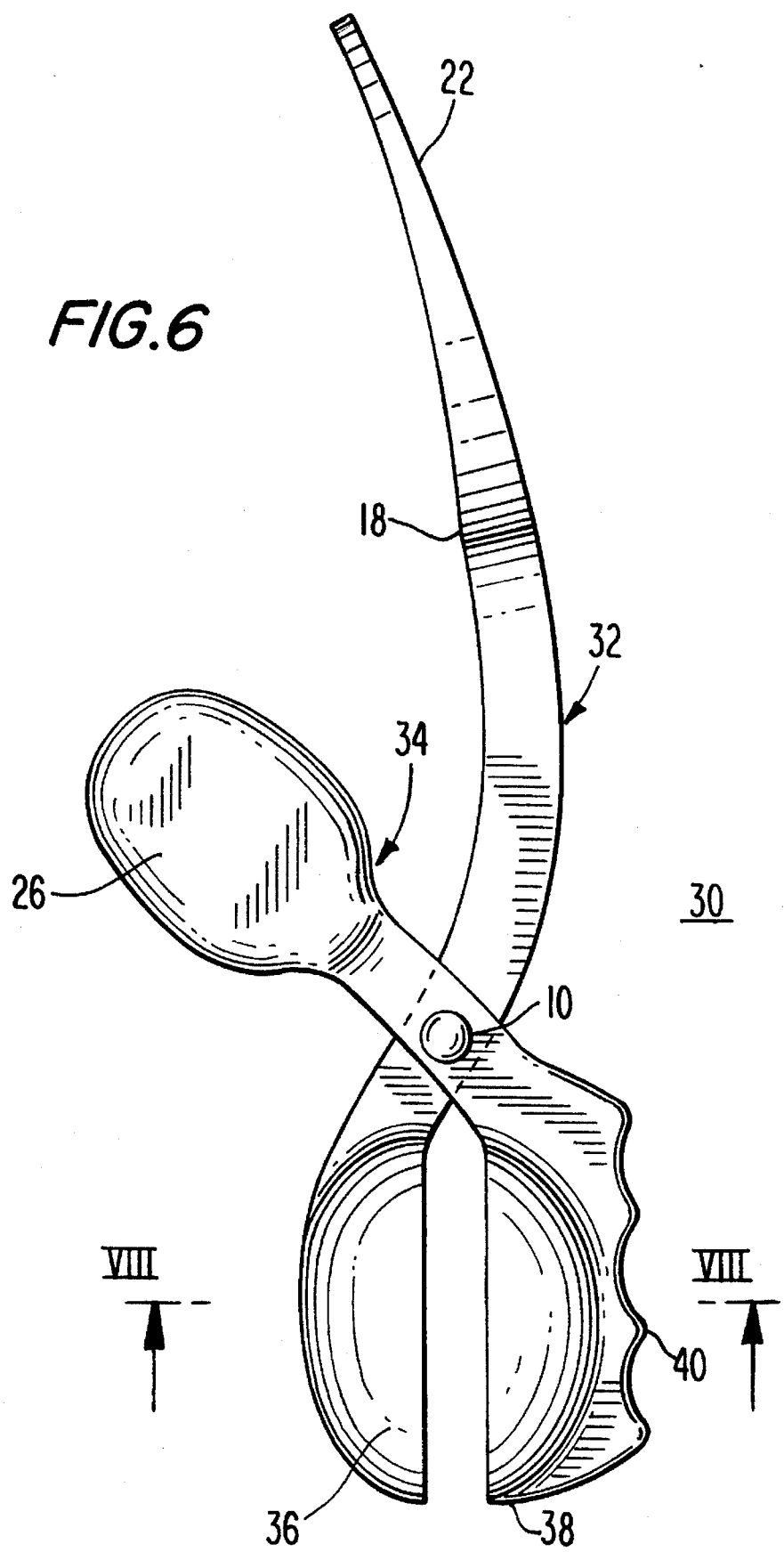
FIG. 6 is a side view of another embodiment of the present invention having a contoured grip.
Figure 7:
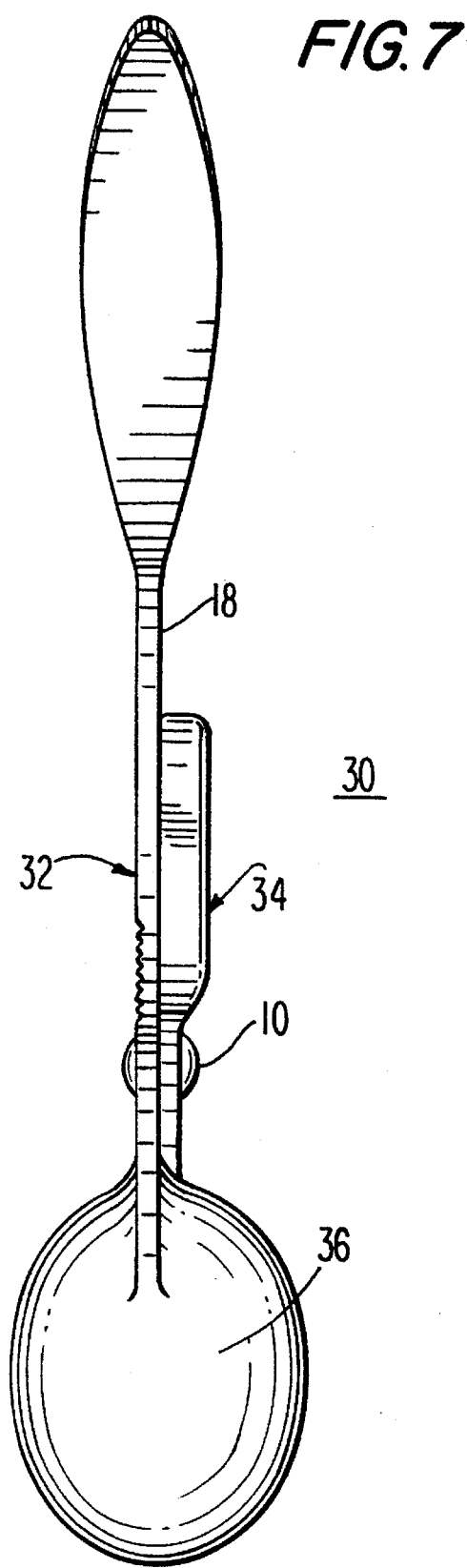
FIG. 7 is a top view of the embodiment of FIG. 6.
Figure 8:
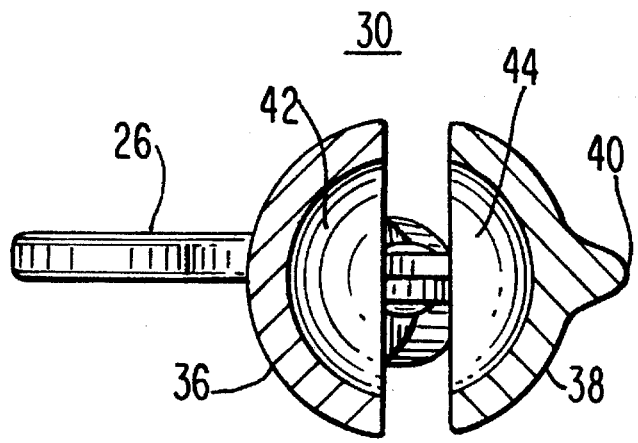
FIG. 8 is a cross-sectional view of the embodiment of FIG. 6 taken along line VIII—VIII.

Referring to FIGS. 6 through 8, a hand tool 30 of a second embodiment of the present invention is shown. The hand tool 30 is similar to the hand tool 2 of the first embodiment except as discussed herein. The hand tool 30 has first and second lever members, 32 and 34, having first and second cupped receiving members, 36 and 38, respectively. The second cupped receiving member 38 has a contoured grip portion 40 designed to comfortably receive fingers of the user's hand. The contoured grip portion 40 acts to effectively distribute forces over the user's middle, ring and little fingers when the hand tool 30 is held in a manner analogous to that depicted for the hand tool 2 of the first embodiment in FIG. 1. The user may also vary the grip of the hand to suit personal preferences. The first cupped receiving member 36 is semi-hemispherical in shape thereby presenting a convex contour which is comfortably accepted in the user's palm. Thus, the first and second cupped receiving members, 36 and 38, are present a contoured shape as a whole which comfortably fits in the user's hand.

Referring to FIG. 8, the hand tool 30 has first and second concavities, 42 and 44, in the first and second cupped receiving members, 36 and 38, respectively. The concavities, 42 and 44, accept placement of an object to be compressed, for example a walnut. The concavities, 42 and 44, serve as a seat for the walnut which permits the user to easily grasp the hand tool 30 without the walnut slipping from between the cupped receiving members, 36 and 38. Operation of any embodiment of the present invention may be further enhanced by the incorporation of a biasing spring serving to bias together receiving members to hold the object to be crushed in place. Various spring arrangements may be effected by those of ordinary skill in the art and are thus not detailed herein.

The cupped receiving members, 36 and 38, are also effective in retaining parts of the walnut subsequent to cracking, thus minimizing a scattering of residues. The concavities, 42 and 44, may be varied in shape to optimize the hand tool for operation upon specific types of nuts. For example, while walnuts are generally spherical, thus dictating the use of the semi-spherical concavities, 42 and 44, concavities defined by oblong depressions may be formed to accept Brazil nuts. Likewise, the size may be varied to accept nuts ranging in size from almonds to walnuts and larger. Furthermore, an insertable filler piece (not shown) may be configured to fit inside one of the concavities, 42 and 44. The insertable filler piece permits reduction of the size of a concavity permitting operation upon smaller nuts.

Figure 9:
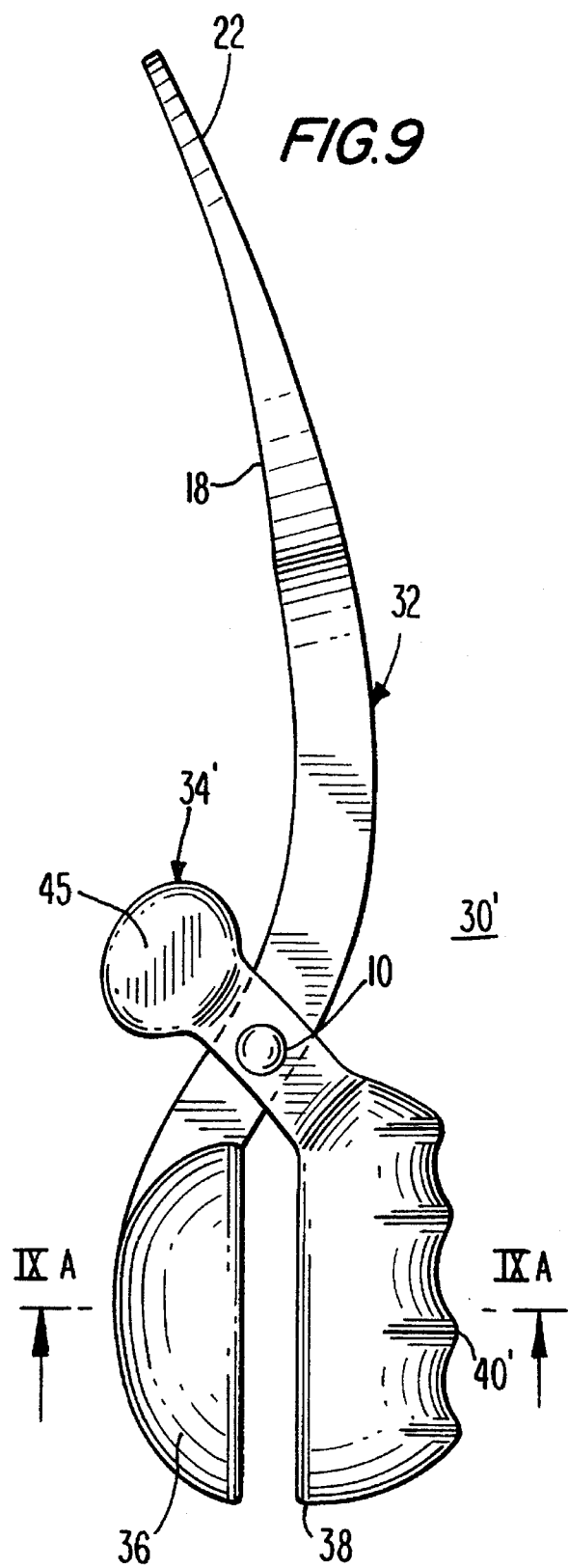
FIG. 9 is a side view of another embodiment of the present invention having another contoured grip.
Figure 9A:
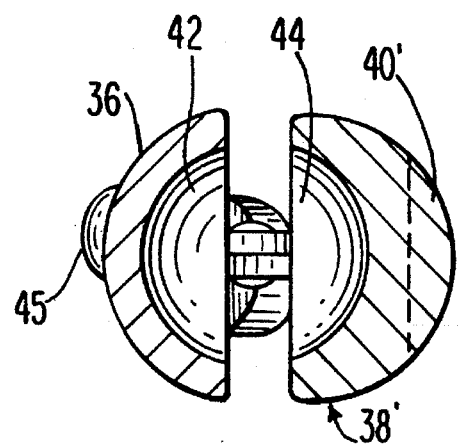
FIG. 9A is a cross-sectional view of the embodiment of FIG. 9A taken along line IXA—IXA

Referring to FIGS. 9 and 9A, a hand tool 30' of a third embodiment of the present invention is shown having an alternative configuration permitting positive grasping of a receiving member 38'. The hand tool 30' is substantially the same as the hand tool 30 of the second embodiment with exceptions as stated below. The hand tool 30' has a contour grip portion 40' wherein contours for accepting fingers extend continuously around an outside peripheral surface of the receiving member 38'. A second lever member 34' extends from the receiving member 38' to the pin 10 and beyond where the second lever member 34' terminates in a counteracting mass 45 proximate the pin 10. The second lever member 34' of the third embodiment is without the support flange 26 of the second embodiment, yielding a more compact construction. The counteracting mass 45 replaces the mass of the support flange 26 to provide the force necessary for effective crushing action. The counteracting mass 45 may be varied in shape including barrel, bulbous, or spherical configurations. Additionally, the counteracting mass 45 is optionally made from a material denser than the rest of the hand tool 2 to more effectively concentrate mass.

The contoured grip portion 40' of the third embodiment enables the user to achieve an adequately firm grasp without using the support flange 26 shown in the second embodiment. Additionally, the contoured grip portion 40' provides mass whose inertia is used in opposing the force of the first cupped receiving member 36. The mass of the contoured grip portion 40' is optionally further increased by selection of dense materials and expansion in size to provide sufficient inertial force to permit the elimination of the counteracting mass 45. However, preferably both the counteracting mass 45 and the contoured grip portion 40' are provided to enhance the balance of the hand tool 2. It is realized that various grip configurations may be employed, with and without the support flange 26, and are considered to be within the scope and spirit of the present invention. Further details of grip configurations are omitted as such configurations are achievable by those skilled in the art having the benefit of this specification.

Figure 10:
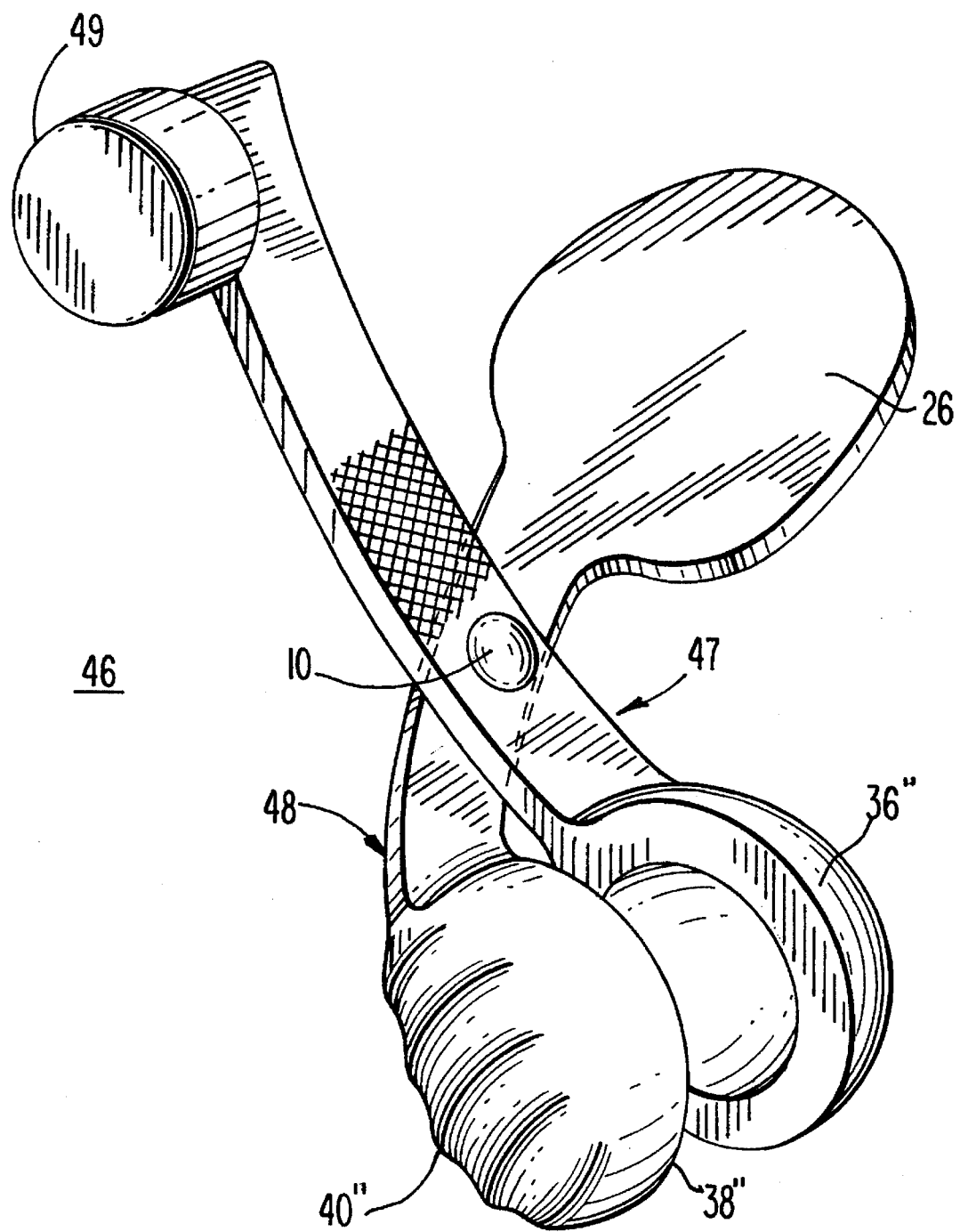
FIG. 10 is a perspective view of another embodiment of the present invention having a striking mallet.

Referring to FIG. 10, a fourth embodiment of a hand tool 46 of the present invention is shown which is similar to the above embodiments with the exception of certain variations noted below. First and second lever members, 47 and 48, have first and second cupped receiving members, 36" and 38". The second cupped receiving members 38" has a massive configuration similar to the receiving member 38' of the above embodiment with a slight variation in shape and includes a contoured grip portion 40" having a slightly more spherical configuration than the contoured grip portion 40' discussed above. The second lever member 48 includes the support flange 26 which is optionally substituted for by the counteracting mass 45 of FIG. 9. The first lever member 47 is shorter than the first lever members, 6 and 32, of the aforementioned embodiments and has a mallet face 49 for striking surfaces. The hand tool 46 has a more compact configuration than the first through third embodiments yet produces sufficient compressive force due to the mass of the support flange 26 or the counteracting mass 45 of FIG. 9.

Figure 11:
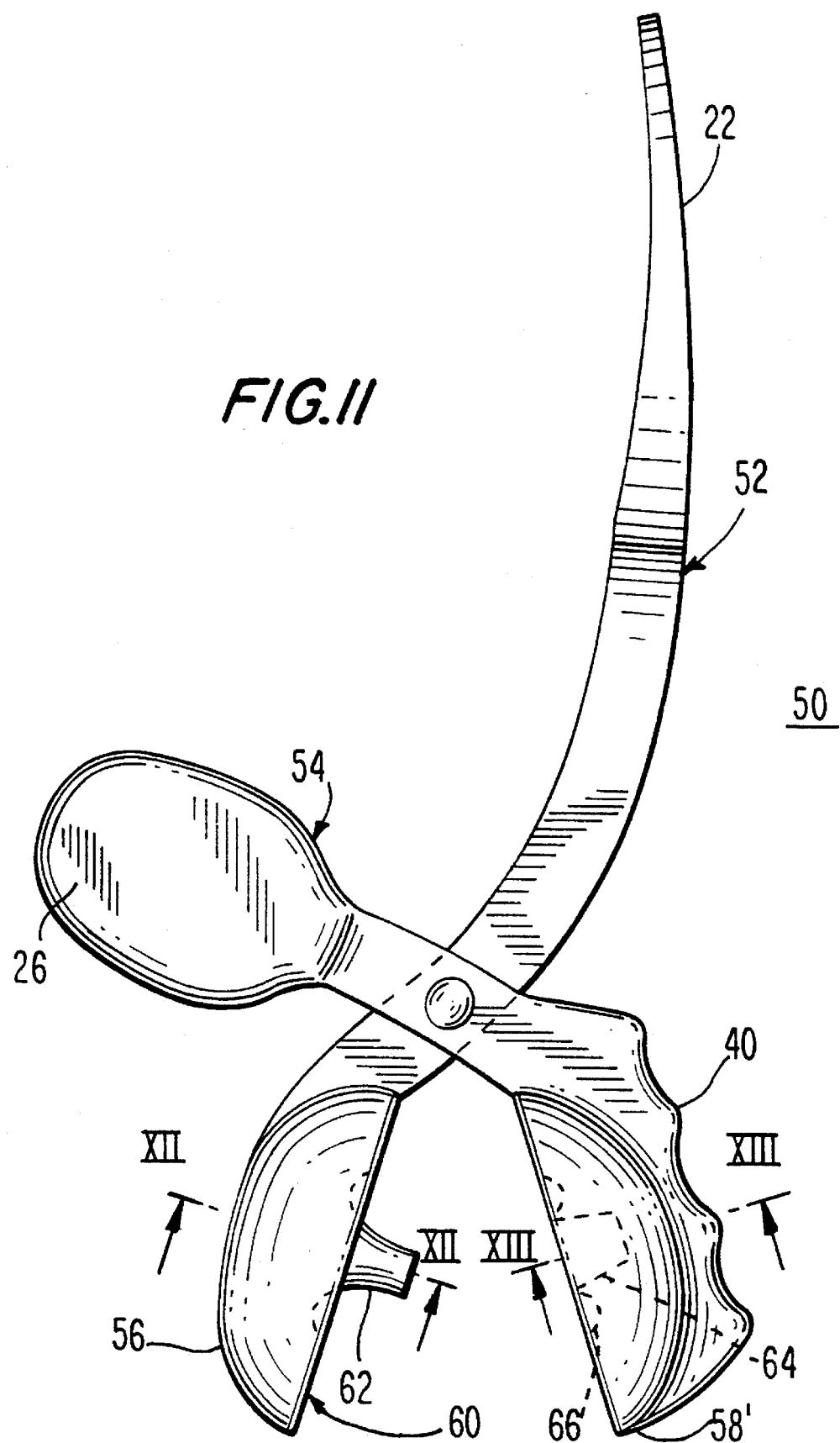
FIG. 11 is a side view of another embodiment of the present invention having receiving ends configured for accepting grommets.
Figure 12:
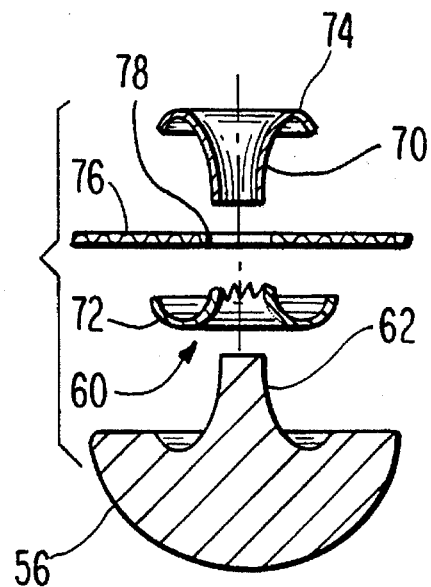
FIG. 12 is a cross-sectional view of a first lever member of the embodiment of FIG. 11 taken along line XII—XII and without an shown.
Figure 13:
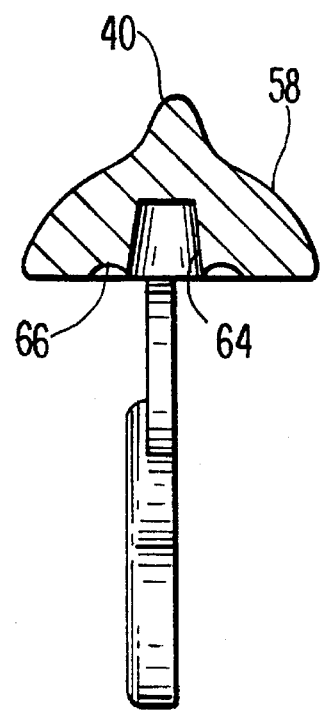
FIG. 13 is a cross-sectional view of a second lever member of the embodiment of FIG. 10 taken along line XIII—XIII.

Referring to FIGS. 11 through 13, a hand tool 50 of a fifth embodiment of the present invention is shown having a configuration for accepting and installing grommets. The hand tool 50 is similar to the hand tool 30 of the second embodiment except as discussed herein. First and second lever members, 52 and 54, have first and second receiving members, 56 and 58, respectively. The first receiving member 56 has a swaging post 62 configured for swaging a grommet post piece 70. The second receiving member 58 has a recess 64 for accepting the grommet swaging post 62 and an annular recess 66 for accepting a ring 74 of the grommet post piece 70.

Operation of the hand tool 50 begins with disposing the grommet ring 72 over the swaging post 62. The user then lays material 76 having a hole 78 for accepting the grommet over the grommet ring 72 with the swaging post 62 extending through both the grommet ring 72 and the hole 78 in the material 76. Finally, the user inserts the grommet post piece 70 onto the swaging post 62, with the grommet post piece 70 extending over the swaging post 62 and towards the first receiving member 56. Once the grommet ring 72, the material 76 and the grommet post piece 70 are in position the user closes the second receiving member 58 over the grommet post piece 70 and holds the hand tool 50 as the hand tool 2 of the first embodiment is held in FIG. 1. The user then strikes the striking face 22 against a surface to install the grommet.

The striking operation drives the first and second receiving members, 56 and 58, together and the swaging post 62 swages the post of the grommet post piece through and over the grommet ring. The hand tool 50 allows the user to install grommets using a single unified device. A need to use a separate pieces such as a swaging die, anvil piece and hammer is eliminated by use of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hand tool for compressing an object comprising:

first and second lever members;

means for pivotally connecting said first and second lever members at a pivot point;

said first and second lever members respectively having said first and second receiving ends configured for accepting the object to be compressed;

said first and second receiving ends being disposed proximate said pivot point;

said first lever member having an arm projecting from said pivot point opposite said first receiving end;

one of said first and second lever members having at least one engagement surface for engaging a user's hand grasping said first and second receiving ends;

said arm having a striking portion for making contact with a surface to effect compression of the object when said striking portion of said arm is struck upon the surface;

said second lever member including a projection extending from said pivot point and terminating opposite said pivot point from said first receiving end, a length of said projection being less than a length of said arm of said first lever and a width of said projection being greater; and said projection having an inertial mass for compressing said object by pivoting said second receiving end toward said first receiving end in response to said arm of said first lever member being struck upon the surface.

2. The hand tool according to claim 1 wherein:

one of said first and second receiving ends includes said at least one engagement surface; and said at least one engagement surface includes means for accepting fingers disposed thereon.

3. The hand tool according to claim 2 further comprising:

said second receiving end including said at least one engagement surface; and said projection including a support flange extending from said pivot point of said second lever member such that said support flange is engageable with a user's hand grasping said at least one engagement surface.

4. The hand tool according to claim 3 further comprising said first and second receiving ends having jaw shaped receptacles for accepting said object.

5. The hand tool according to claim 3 further comprising said first and second receiving ends having cupped receptacles for accepting said object.

6. The hand tool according to claim 3 further comprising:

one of said first and second receiving ends having a grommet swaging post; and another one of said first and second receiving ends having a grommet swaging anvil configuration complementing said grommet swaging post.

7. The hand tool according to claim 1 wherein said projection includes said at least one engagement surface in the form of a support flange for said second lever member; and said support flange extending from said pivot point on said second lever member such that said support flange is engageable with a user's hand grasping said second receiving end.

8. The hand tool according to claim 7 further comprising said first and second receiving ends having jaw shaped receptacles for accepting said object.

9. The hand tool according to claim 7 further comprising said first and second receiving ends having cupped receptacles for accepting said object.

10. The hand tool according to claim 7 further comprising:

one of said first and second receiving ends having a grommet swaging post; and another one of said first and second receiving ends having a grommet swaging anvil configuration complementing said grommet swaging post.

11. A method for compressing an object comprising:

providing first and second lever members pivotally connected at a pivot point;

said first and second lever members respectively having said first and second receiving ends configured for accepting the object to be compressed;

said first and second receiving ends being disposed proximate said pivot point;

said first lever member having an arm projecting from said pivot point opposite said first receiving end;

said second lever member including a projection extending from said pivot point and terminating opposite said pivot point from said first receiving end;

said projection having an inertial mass for compressing said object by pivoting said second receiving end toward said first receiving end in response to said arm of said first lever member being struck upon a surface;

inserting the object to be compressed between said first and second receiving ends;

grasping in one hand said first and second receiving ends with said object to be compressed therebetween; and striking said arm of said hand tool against a surface thereby compressing said object.

12. The method of claim 11 wherein the object to be compressed is a nut and adequate compression constitutes cracking said nut.

13. The method of claim 11 wherein the object to be compressed is a grommet post piece and adequate compression constitutes that which is sufficient to swage said grommet post piece as required for installation.

14. A hand tool for compressing an object comprising:

first and second lever members;

means for pivotally connecting said first and second lever members at a pivot point;

said first and second lever member respectively having said first and second receiving ends configured for accepting the object to be compressed;

said first and second receiving ends being disposed proximate said pivot point;

said first lever member having an arm projecting from said pivot point opposite said first receiving end;

said second receiving end including means for accepting fingers disposed thereon in indentations contoured to accept fingers;

said second lever member including a support flange extending from said pivot point of said second lever member such that said support flange is engageable with a user's hand grasping said second receiving end at said means for accepting fingers; and said support flange providing mass to compress the object by pivoting said second receiving member toward said first receiving member when an end of said arm is struck on a surface.

* * * * *